United States Patent [19]

Tejada et al.

[11] Patent Number: 5,136,633
[45] Date of Patent: Aug. 4, 1992

[54] INTERNATIONAL AUTHORIZATION SYSTEM

[75] Inventors: George Tejada, Hayward; Farzad Naimi, Redwood City, both of Calif.

[73] Assignee: Visa International Service Association, San Mateo, Calif.

[21] Appl. No.: 614,081

[22] Filed: Nov. 13, 1990

Related U.S. Application Data

[63] Continuation-in-part of Ser. No. 472,317, Jan. 30, 1990, abandoned.

[51] Int. Cl.$^5$ .............................................. H04M 11/00
[52] U.S. Cl. .......................................... 379/91; 379/97
[58] Field of Search ........................ 379/91, 88, 89, 93, 379/97

[56] References Cited

U.S. PATENT DOCUMENTS

| | | | |
|---|---|---|---|
| 4,587,379 | 5/1986 | Masuda | 379/91 |
| 4,608,460 | 8/1986 | Carter et al. | 379/89 |
| 4,677,552 | 6/1987 | Sibley, Jr. | 379/93 |
| 4,757,267 | 7/1988 | Riskin | 379/88 |
| 4,958,366 | 9/1990 | Hashimoto | 379/88 |
| 5,014,301 | 5/1991 | Maltezos | 379/88 |
| 5,021,889 | 6/1991 | Yamamoto | 379/100 |

*Primary Examiner*—James L. Dwyer
*Assistant Examiner*—Stella L. Woo
*Attorney, Agent, or Firm*—Heller, Ehrman, White & McAuliffe

[57] ABSTRACT

A network system is disclosed for handling telephone requests for authorizing financial transactions between a merchant (10) and the issuer (20) of the transaction card presented for the transaction. The network system includes an intelligent switch (14) for receiving an incoming call from a merchant. The switch includes a Voice Response Unit (VRU) (16) which generates a request for the merchant to enter the account number of the transaction card. The switch then determines the issuer based on data contained in the account number received from the merchant (118). The switch then initiates a call to the issuer (120). The switch then connects the merchant and issuer to enable the issuer to obtain additional information, directly from the merchant, for evaluating the transaction (132). Once the information has been received, the issuer will generate an approval code which is relayed by the switch to the merchant (146, 148). The switch will also keep a record of the transaction parameters (154). If the merchant and issuer are located in different countries, the switch can add a bilingual operator to the call for translating the verbal communications between the merchant and the issuer (232).

19 Claims, 6 Drawing Sheets

INTERNATIONAL AUTHORIZATION SYSTEM

This application is a continuation-in-part of prior copending application Ser. No. 07/472,317, filed Jan. 30, 1990 now abandoned.

TECHNICAL FIELD

The subject invention is designed to handle telephone requests for authorizing financial transactions. More specifically, a telephone switching network is disclosed designed to automatically connect a merchant with the issuer of a transaction card presented for a purchase thereby enabling the issuer to obtain information directly from the merchant for evaluating the transaction. In one embodiment, a method is disclosed for handling international requests.

BACKGROUND OF THE INVENTION

There presently exists a number of transaction card networks of the type operated by the assignee of the subject invention. These transaction card networks include a number of financial institutions which issue a particular type of transaction card to its customers. Each of these types of cards bear a common trademark of the network, such as Visa or Mastercard. Nonetheless, it is the individual financial institutions (issuers) which maintain the accounts of the customers. Accordingly, in order to authorize a transaction, it is often necessary to contact the issuer so that information about a particular account can be accessed.

When a transaction card is presented for a purchase, some form of authorization is typically sought to minimize the risk of loss to the merchant. Historically, the earliest method of authorization consisted of consulting a list of bad account numbers. This list is distributed by the network operator based on information obtained from the card issuers. The account numbers in the list represent cards which should not be accepted. These cards may have been reported lost or stolen or simply represent accounts where the credit limit has been exceeded. If the account number of the card is not present on the list, the merchant can accept the card for the purchase.

More recently, there have been developed relatively sophisticated electronic authorization networks. In these communication networks, the merchant is provided with an intelligent terminal which can read account information encoded on the magnetic stripe of the transaction card. The terminal will then automatically call a central processor, operated by the network, which will analyze the authorization request. The call from the terminal is typically routed through a local financial institution, associated with the merchant. The local financial institution, which sponsors the merchant, is often called the acquirer.

Once the central processor receives the call, it will then initiate an electronic data link to the processor operated by the card issuer to determine if the transaction should be approved. The processor at the issuer will check the status of the account within its data base and generate a response. This electronic response is then routed back to the merchant's terminal. In some cases, where the issuer's computer is not available, the central processor itself can act on the authorization request and perform what is known as stand-in processing. This process occurs electronically, without human intervention. A more complete description of this type of electronic authorization system is described in U.S. Pat. No. 4,485,300, assigned to the same assignee as the subject invention and incorporated herein by reference.

Most requests for transaction authorizations can be completed electronically, within the network system outlined above. However, in a small percentage of the cases, the limited information which is transmitted to the issuer's computer is deemed insufficient to complete the authorization process. In these cases, rather than approving or declining the transaction, the issuer's computer will generate a "referral" message. A referral message signals the merchant that more information is necessary to complete the authorization procedure.

Presently, the steps which much be taken by the merchant in response to a referral message are time consuming and cumbersome. More specifically, the merchant must first make a standard telephone call to an operator at his local financial institution (acquirer) to initiate the inquiry. The operator at the acquirer will then determine the identity of the issuer of the card and call an operator at that issuer. The operator at the issuer will inform the operator at the acquirer what additional authorization information is necessary to confirm the identity of the customer. This information could include, for example, a request for a driver's license number of the customer. The operator at the acquirer will then call back the merchant and request the desired information. When the information is received, the operator will then supply the information to the operator at the issuer. The issuer will then decide if the transaction can be approved and provide a response to the operator at the acquirer. The operator at the acquirer will then relay the response to the merchant.

The above described process often requires four separate telephone calls and generally takes from 8-12 minutes. As can be appreciated, this delay at the point of sale is unacceptable for both the merchant and the customer. It is hardly surprising that in about half of all cases where a "referral" message is generated in domestic transactions, merchants will not go through with the referral procedure. It is far simpler for the merchant to ask the customer to provide another form of payment, such as a check or another credit card. As can be appreciated, each time a merchant switches to another form of payment, the sale through the network generating the response is lost.

While referral responses are generated in only about one percent of all authorization requests, in absolute terms, the number is quite high. At the present time, there are over 600,000 referral requests generated per month in the network operated by the assignee. It has been found that of the fifty percent of domestic transactions where the merchant does not carry out the referral procedure, upwards of ninety percent of the transactions would have been approved by the issuer. Also significant is the fact that the referral responses typically are generated on transaction having a high dollar amount. Based on the above statistics, it has been estimated that the present system, which discourages handling referrals, creates a loss of about one billion dollars per year in transactions for the network. Therefore, it would be desirable to design an improved system for handling authorization requests generated by referral responses. It would also be desirable if the system could overcome the language barrier encountered when dealing with international transactions.

SUMMARY OF THE INVENTION

The subject invention satisfies this desire by providing a network switching system which is faster, more reliable and will therefore encourage merchants to complete the transaction within the network even when faced with an initial referral response. This goal is achieved by providing an intelligent telephone switching system which includes a digital voice response unit. The telephone switching system is capable of receiving a call directly from a merchant and automatically initiating a call to the issuer of the card presented for the transaction. The switching system can then connect or bridge the two calls enabling the operator at the issuer to request additional verbal information directly from the merchant. After sufficient information is received, the issuer will generate an authorization message which is routed to the merchant. It is expected that this procedure will take less than four minutes to complete.

Preferably, the merchant will be given a single toll free number to call when he receives a referral response to an electronic authorization request. The merchant's telephone call will be received by the intelligent switch. A voice response unit (VRU) will generate a request that the merchant enter the account number of the card using the touch tone buttons on the telephone. Based on the information contained in the account number, the switch will determine the issuer of the card and initiate a call to an operator at the issuer. Upon receiving a prompt from the operator, the VRU will relay the account number to the operator. The operator will then enter the account number into the processor of the issuer and retrieve the account information. When the account information is retrieved, the operator will signal the switch and the two calls will be bridged.

At this point, the operator at the issuer can talk directly to the merchant and request additional authorization information. As before, this information can include data such as the driver's license number of the customer. When this data is confirmed, the authorization process can be completed.

In the preferred embodiment of the subject invention, after the desired information is received, the operator at the issuer signals the switch to unbridge the calls. The operator then enters the authorization code which is relayed to the merchant by the VRU. The switch also keeps a record of the authorization code, along with all the other parameters of the procedure. Once the merchant receives the authorization request, the call is disconnected.

In order to operate successfully, the system also includes some default procedures. For example, if the issuer is unavailable (i.e., busy, processor down, etc.) the switch will contact a default processor operated by the network. The default processor will act as a substitute for the issuer and attempt to authorize the transaction in a manner similar to normal stand-in processing but with different approval parameters. Other default processing steps will be discussed in detail below.

The above described procedures are effective for calls between merchants and issuers that speak the same language. Further difficulties arise with international transactions wherein the merchant and issuer are located in different countries and speak different languages. In this case, it is difficult for the merchant and issuer to exchange information about the transaction. The latter scenario is quite common in the European markets.

The problems associated with international transactions are addressed in the second embodiment of the subject invention. In the second embodiment the switch functions to determine the country in which the merchant and issuer are located. The VRU at the switch is provided with the capability of generating speech in the language of the country in which the merchant and issuer are located.

In accordance with the second embodiment, when the call between the merchant and the issuer is bridged, the switch will also establish a connection with a bilingual operator. The operator which is selected will be conversant in the languages of both the merchant and the issuer. The operator can than act as a translator, enabling the merchant and issuer to exchange information so that the issuer can evaluate the transaction. In this manner, international referral requests can be easily handled.

The full details of the subject invention will become apparent from the following detailed description taken in conjunction with the drawings in which:

DETAILED DESCRIPTION OF THE PREFERRED EMBODIMENT

Figure 1:
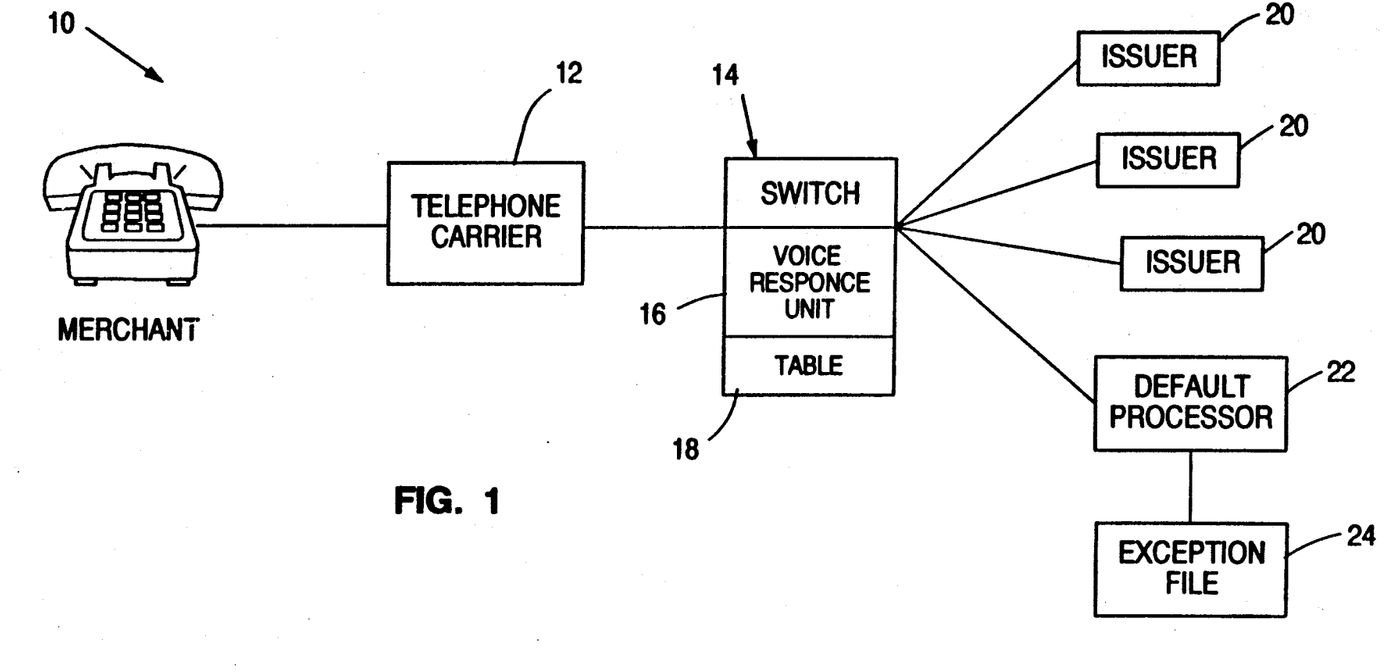
FIG. 1 is a block diagram of the network system incorporating the subject invention.

Turning to FIG. 1, there is illustrated a block diagram of the network system of the subject invention. The network system functions to connect individual merchants with the issuers of a particular transaction card. The system is designed for use in handling authorization requests based on referrals generated by an issuer to an initial electronic approval request.

As discussed above, when a customer presents a transaction card for a purchase, the merchant will typically attempt to obtain an authorization from the transaction card network. Today, a large number of merchants are provided with point of sale transaction terminals which can automatically generate a request for approval of the transaction. Most transactions are authorized and an approval code is generated which is displayed on the terminal and recorded on the sales draft by the merchant. In some cases, the transaction is declined and the purchase will be terminated. It should be noted that this system is essentially transparent to the merchant. The merchant does not need to know who or where the issuer is and merely receives a response displayed on the terminal.

In about one percent of domestic authorization requests, the issuer's computer will generate a "referral" response. The level of referrals is closer to five percent for international transactions. Referrals are generated when the issuer requires further information in order to approve the transaction. There are a number of reasons why an issuer might generate a referral response. For example, a referral is often generated when the amount of purchase is rather large. A referral can also be generated when the customer's account shows an unusually large number of transactions in a short period of time. A referral is also generated when a request for authorization by the merchant is inadvertently repeated. As can be appreciated, there is no specific reason why any of these transactions should not be ultimately approved. In fact, upwards of ninety percent of all transactions which provoke a referral will ultimately be approved.

In accordance with the subject invention, when a merchant receives a referral response from an issuer, he will initiate a call to a toll free number using a standard telephone 10. This call will be handled by the local carrier and routed to the selected toll free carrier such as AT&T or MCI. Box 12 is intended to illustrate this combination of the local and long distance carriers. This routing system is well established and need not be discussed herein.

In accordance with the subject invention, the carrier 12 will then route the call to an intelligent switch 14. The intelligent switch 14 includes routing hardware and software. The switch 14 also includes a Voice Response Unit (VRU) 16 of the type found in the prior art. The processor controlling the switch 12 also includes a memory for storing a table 18. Table 18 includes data which allows the switch processor to determine the issuer of the card presented for the transaction based on the account number of the card. In the Visa system, for example, the first six numbers of the transaction card identify the issuer and are known as the Bank Identification Number (BIN). In the Visa system, there are over four thousand financial institutions that issue transaction cards. The table 18 will also include a list of telephone numbers of each of the issuers. As used herein, the term issuer will also include the agent of the issuer selected to process the authorization requests.

The switch 14 is capable of initiating a call to the issuer 20 which has been identified based on the account number of the card. The switch 14 is also capable of bridging the call between the merchant and the operator of the issuer to allow the issuer to question the merchant directly and obtain more information to verify the identity of the customer.

As illustrated in FIG. 1, the switch is also capable of initiating a call a default processor 22 in the event that the issuer is unavailable. The procedure for handling the latter situation will be discussed in greater detail below.

The are a number of processors available which can perform the functions of the switch 14. For example, a model TVS-2000 manufactured by Diteck can be used. Alternatively, a System 85, manufactured by AT&T and used in conjunction with a PC can be used.

Figure 2A:
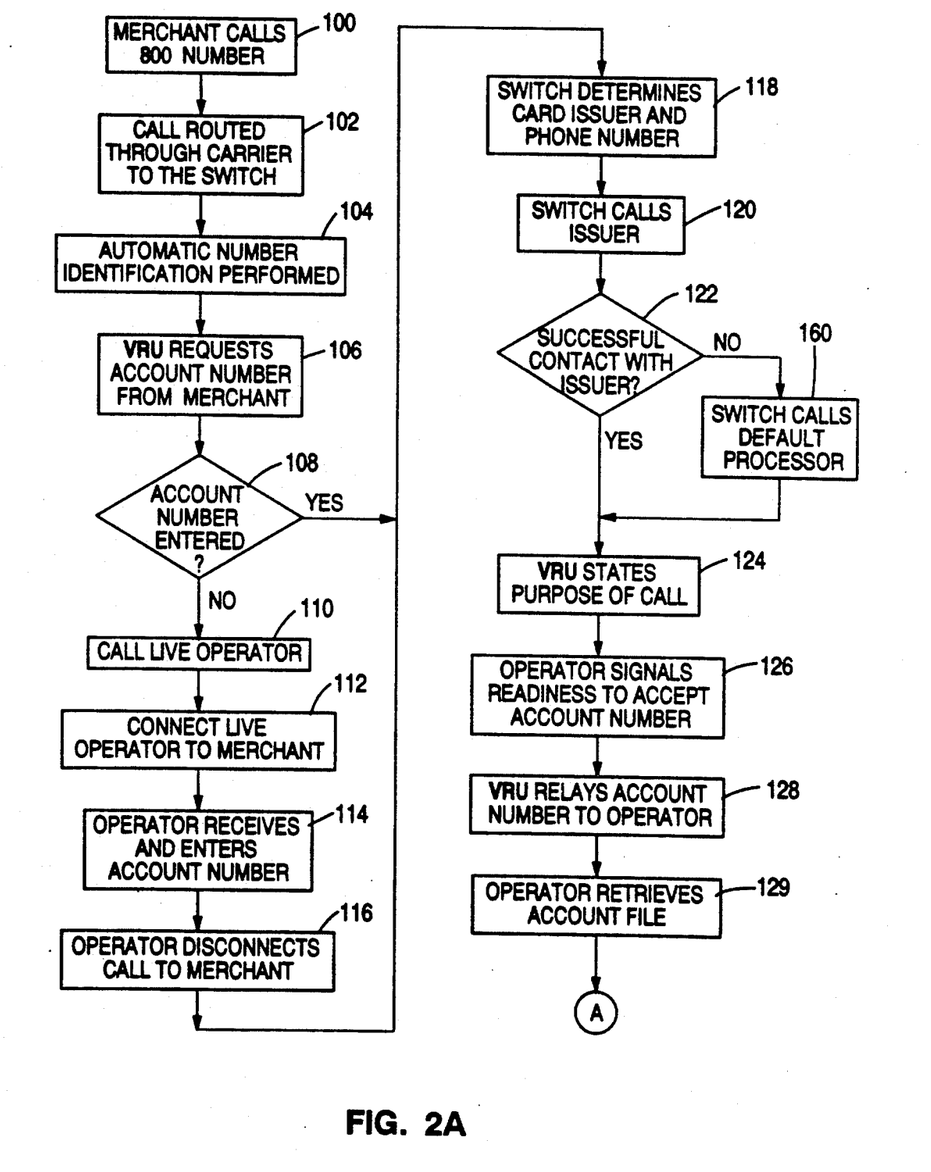
FIGS. 2A and 2B are a composite flow chart of the steps performed in the process of the subject invention.
Figure 2B:
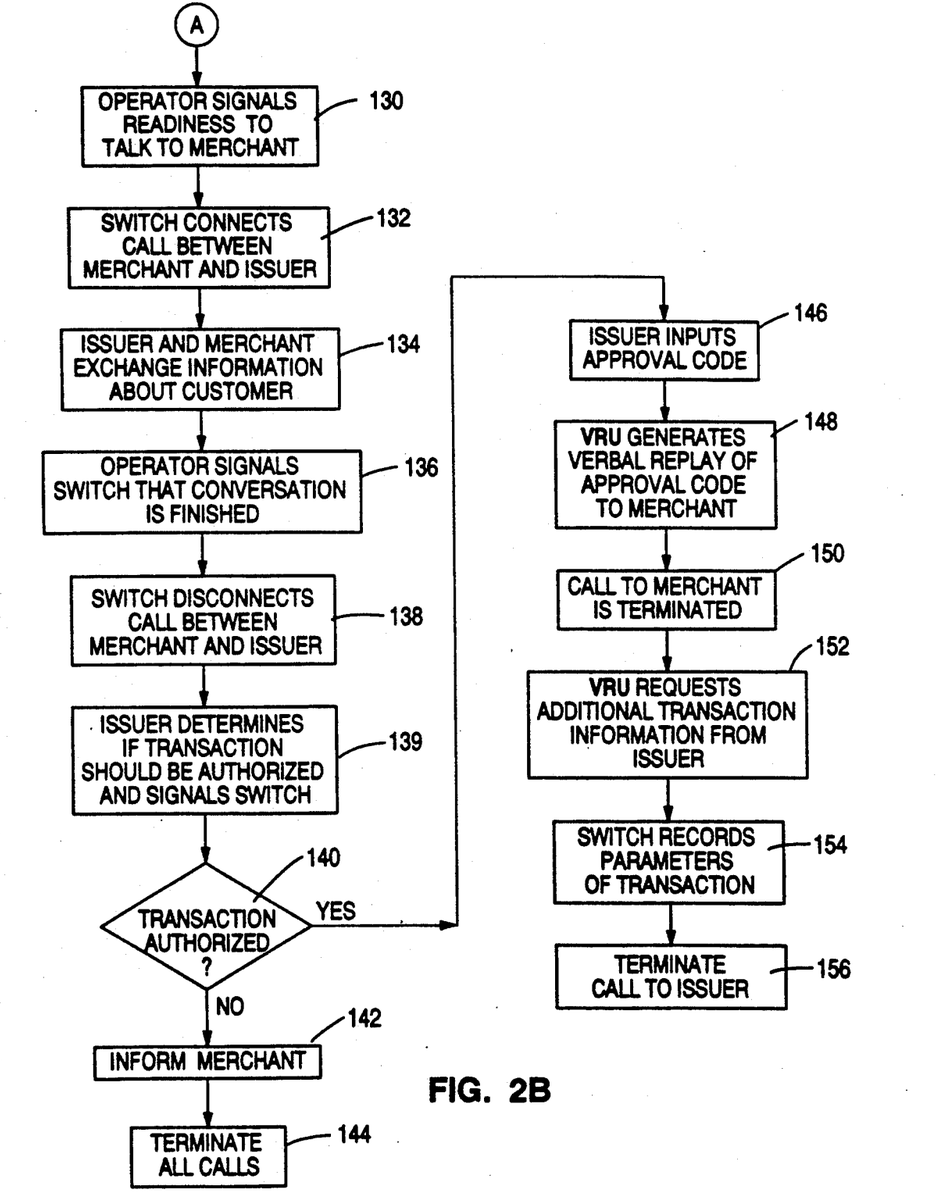

Turning to FIGS. 2A & 2B, a flow chart is provided illustrating the steps which are performed to carry out the method of the subject invention. More specifically, the first step after receiving a referral response consists of the merchant initiating a call to the toll free number (Step 100). In step 102, the call is routed through the carrier 12 to the switch 14.

The first action by the switch is to perform Automatic Number Identification (ANI) (Step 104). ANI processing functions to record the telephone number of the incoming call. Other parameters such as the date and time of the call are also recorded. The ANI information is desirable for eventual reconciliation of the transaction data. In addition, if the connection to the merchant is broken, the switch 14 can automatically redial the merchant based on the stored data. Software for performing ANI procedures is available and known to those skilled in the art.

In step 106, the Voice Response Unit (VRU) 16 electronically generates a verbal request to the merchant to enter the account number of the card using the touch tone buttons on the merchant's phone. If the account number is not entered, the system will assume that the merchant has a rotary phone (Step 108). It is expected that this will occur in only about ten percent of the cases. If it does occur, the system must default to a live operator. More specifically, the switch will contact a live operator trained to request and receive the account number from the merchant. (Step 110) The switch will then connect the live operator to the merchant in step 112. The merchant will then give the account number to the operator who enters the number into the system (Step 114). At this point, the live operator associated with the switch is no longer necessary and is disconnected from the merchant. (Step 116)

Prior to step 118, the switch will have received the account number, either directly from the merchant or indirectly from the internal operator. Accordingly, the processor at the switch can then determine the issuer of the card and the phone number of the issuer from table 18. In step 120, the switch will call the issuer.

The switch must then determine if the issuer is available and if the operator is ready to receive the account number (Step 122). The switch will monitor the call to see if a busy signal is encountered or whether there was a ring and no answer or if the call was answered but lands on an Automatic Call Distribution System (ACD) (i.e., music on hold, etc.) If any of the latter situations are detected, the call will be routed to the default processor discussed in greater detail below.

Assuming an operator at the issuer is reached, the VRU will inform the operator of the nature of the call (i.e., a referral request is pending) and will ask that the operator signal that he is ready to receive the account number (Step 124). The operator will then generate a readiness signal using the touch tone buttons of the telephone, for example, by hitting the # button twice (Step 126). Once this signal is received, the VRU relays the account number to the operator (Step 128). The operator can then retrieve the associated account information stored in the issuer's computer (Step 129). This account information will include data on the customer which can be used to verify the identity of the customer. The information can include a driver's license number, a social security number, a birth date or the maiden name of the customer's mother.

Once the account information is retrieved, he will signal the switch that the merchant can be connected (Step 130). The switch will then connect or bridge the incoming call from the merchant with the operator at the issuer (Step 132). The issuer's operator can then request further information about the customer directly from the merchant (Step 134).

Once the operator has received sufficient information, he will signal the switch (i.e., by hitting the # sign twice.) (Step 136) The switch will then unbridge the call in step 138. The issuer will then determine if the transaction should be approved and signals the switch (Step 139). The switch then analyzes the response from the issuer in step 140. If the transaction was not approved, the VRU simply informs the merchant (Step 142) and terminates the calls to the merchant and the operator (Step 144).

If the transaction is approved, the issuer will enter an approval code (Step 146). The VRU at the switch will generate a verbal replay of the approval code for the merchant (Step 148). The switch will then terminate the call with the merchant (Step 150). The merchant will typically enter the approval code onto a sales draft.

In the preferred embodiment of the subject invention, the VRU will then request further information from the operator at the issuer regarding various parameters of the transaction (Step 152). For example, information may be sought as to whether the transaction was a credit card purchase or a cash advance. This information, along with the approval code and the ANI data are all recorded by the switch in step 154. This information can be supplied to the network operator and distributed to the issuers at a later time. Once the additional information is recorded, the switch will terminate the call with the issuer in step 156.

In the procedure set forth above, the bridge between the merchant and the issuer is disconnected prior to the merchant being informed of the authorization decision. This approach is desirable to permit the switch to receive and record the authorization decision generated by the issuer. Nonetheless, it is within the scope of the subject invention that the issuer's operator provide the merchant with the decision directly. This decision could still be provided to the switch for subsequent recording.

As noted above, the are a number of reasons why the issuer might be unavailable to perform the authorization. In the preferred embodiment, if the issuer is unavailable, the switch will contact a default processor 22 in Step 160. Default processor has access to some authorization information supplied by the issuers. For example, the default processor will have access to an exception file 24 which lists invalid account numbers supplied to the network operator by the issuers. The exception file is similar to, but contains more information than, a hot card list discussed above.

As shown in FIG. 2, once the operator at the default processor is contacted, the next steps are the same as when the issuer is contacted directly. In this manner, the merchant will be unaware that the default processor and not the issuer has been contacted. It should be appreciated that since the information at the default processor is limited, the assessment of the transaction will also be limited. Thus, while the default processor operator may ask for a driver license number, it cannot be verified. This information will nonetheless be supplied to the switch (Step 154) and ultimately forwarded to the issuer for evaluating the process. The default processor operator will, however, determine if the account number is present in the exception file. If so, the transaction will be declined. The operator can also decline the transaction if the amount in question is excessive (i.e. greater than $1,000.00) Once the determination is made, the operator will signal the switch as in Step 139. If the transaction is declined, the merchant is informed and the call is terminated (Steps 142, 144). Alternatively, if the transaction is approved, the default processor will enter an approval code which is relayed to the merchant (Steps 146, 148).

Figure 3:
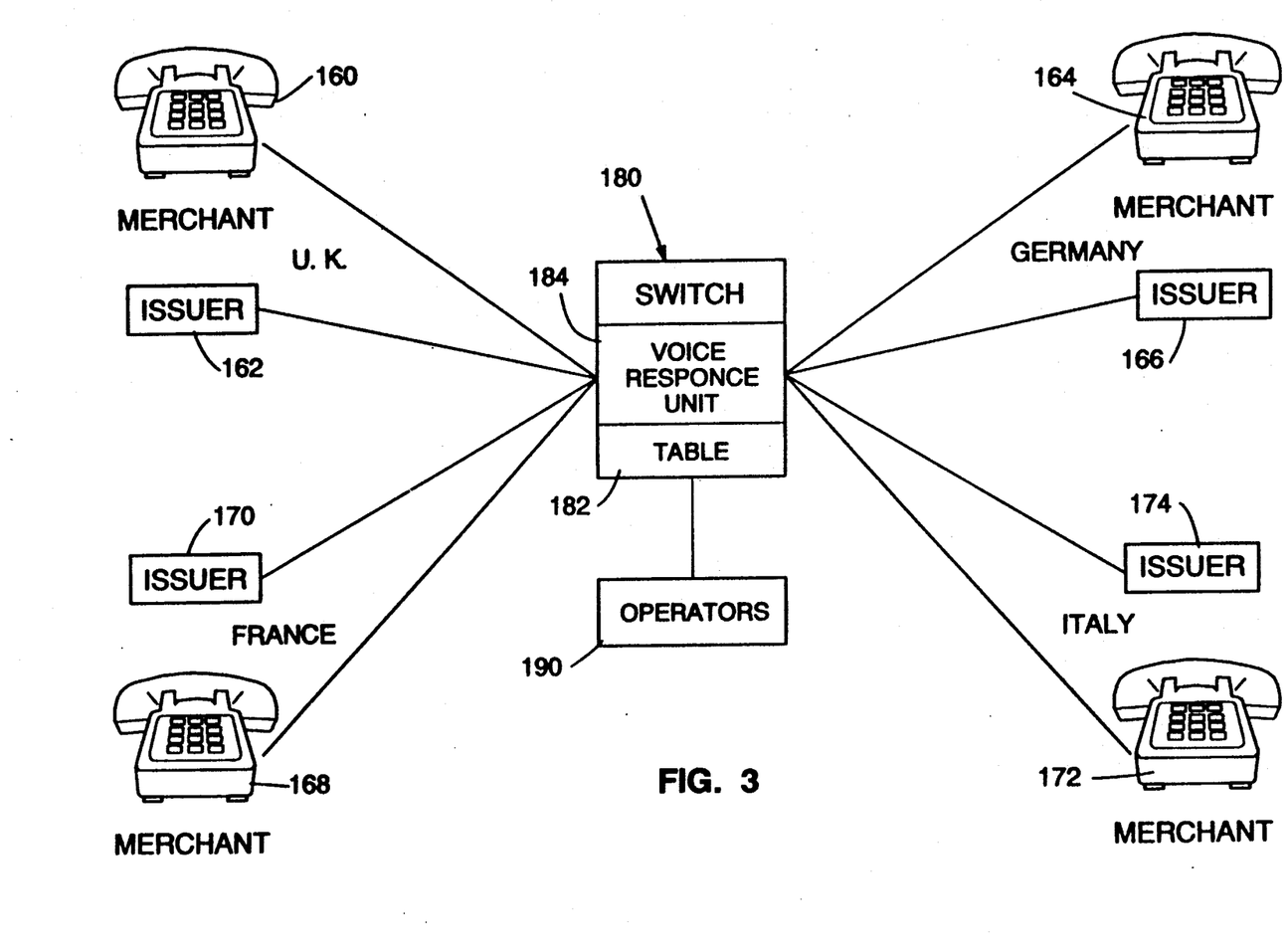
FIG. 3 is a block diagram of the network system incorporating the subject invention for use with international transactions.

Turning to FIG. 3, there is illustrated a schematic diagram of a network which is designed to handle international requests for authorization. As noted above, the number of international transactions which occur is rapidly increasing and such transactions are already quite common in the European community. FIG. 3 illustrates merchants 160, 164, 168 and 172 as being located in four different countries, U.K., Germany, France and Italy, respectively. Similarly, issuers 162, 166, 170 and 174 are located in each of the four countries. For the purposes of this application, an international transaction is defined as one in which the merchant is located in a country different from the country in which the issuer of the transaction card is located.

Issuers in the European markets generate a higher percentage of referrals than domestic issuers. At this point in time, about five percent of all international transactions are subject to referrals. Even more significantly, the rate at which the merchants fail to complete international transactions subject to referrals exceeds seventy-five percent. The reason for this exceptionally high rate is based on the high costs of long distance and long duration telephone calls as well as the language barrier. The subject invention is intended to address both of these problems.

As can be appreciated, personnel at the merchants and issuers will generally speak the principal language of the country in which they are located. While some of these employees might be bilingual, most are not. More significantly, it is quite rare for a sales clerk to be fluent in all of the European languages. Accordingly, it becomes quite difficult if not impossible to obtain the authorization information necessary to approve a transaction through verbal communication between a sales clerk and an issuer who do not speak the same language.

In accordance with this embodiment of the subject invention, the switch 180 is designed to facilitate such communication. The switch 180 can be located in any of the countries. As in the first embodiment, the switch 180 includes a table 182 which allows the switch to determine the card issuer based on the account number of the card. This table will also provide the country in which the issuer is located. The switch can also determine the country in which the merchant is located using the Automatic Number Identification (ANI) function discussed above The switch further includes a voice response unit (VRU) 184. However, in this embodiment, the VRU 184 is programmed to communicate in multiple languages. This facility is useful when the VRU is communicating with either the merchant or the issuer. In the preferred embodiment, the VRU can be programmed to help the issuer and merchant communicate if a bilingual operator is not available.

In the preferred scenario, the system includes a staff of bilingual operators 190. The switch will maintain a record of the languages each operator can speak along with their respective telephone extensions. During a request initiated by a merchant, the switch will determine the countries in which the merchant and issuer are located. If they are different, the switch will then select an operator who is fluent in the two principal languages spoken in the respective countries. When the call between the merchant and the issuer is bridged, the selected operator will also be connected to the call so that the operator can act as a translator to facilitate the exchange of information. Once the exchange of information is finished, the transaction can be completed by following the steps described above with reference to the first embodiment.

Figure 4A:
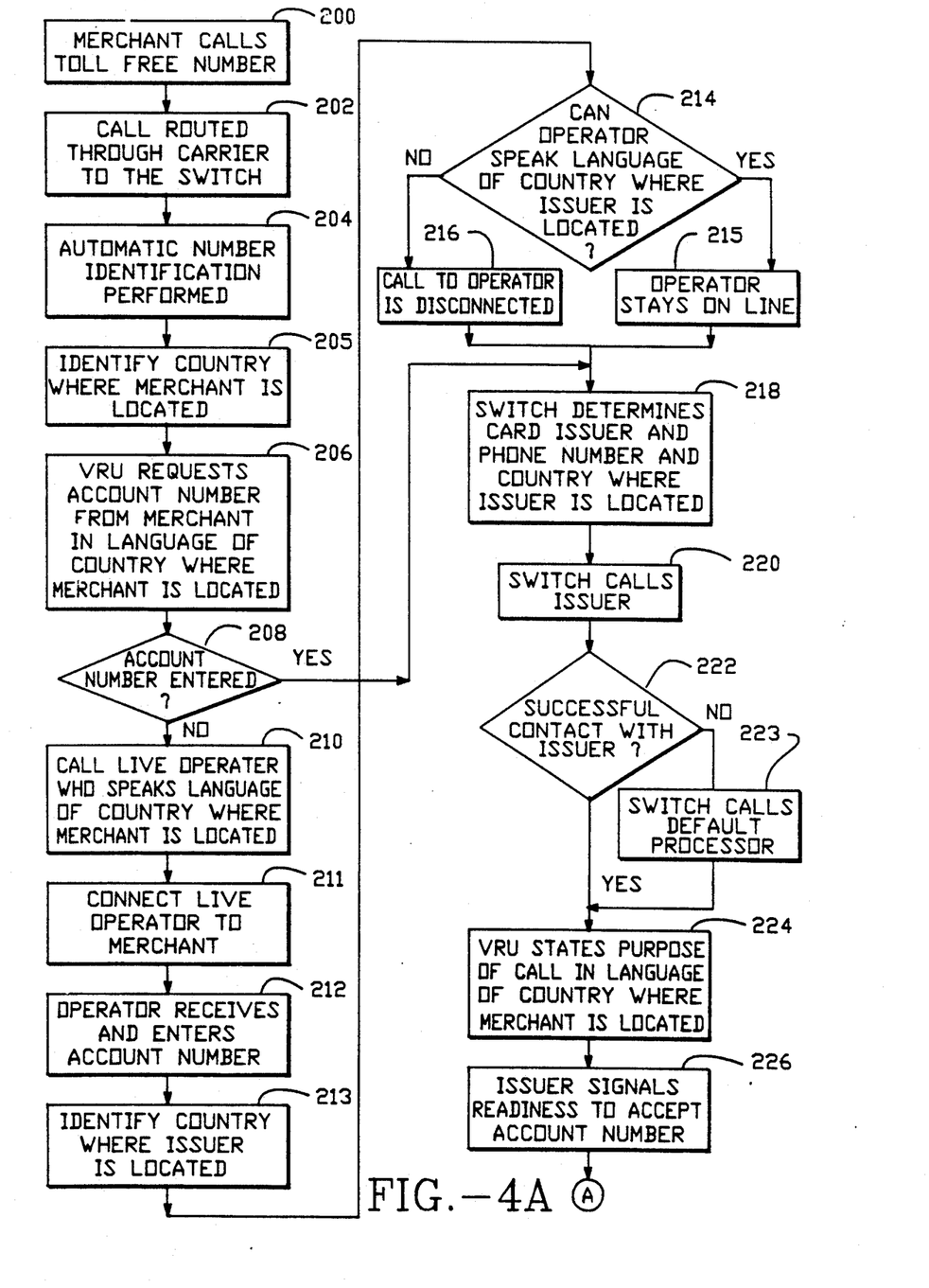
FIGS. 4A and 4B are a composite flow chart of the steps performed in the process of the subject invention when handling international transactions.
Figure 4B:
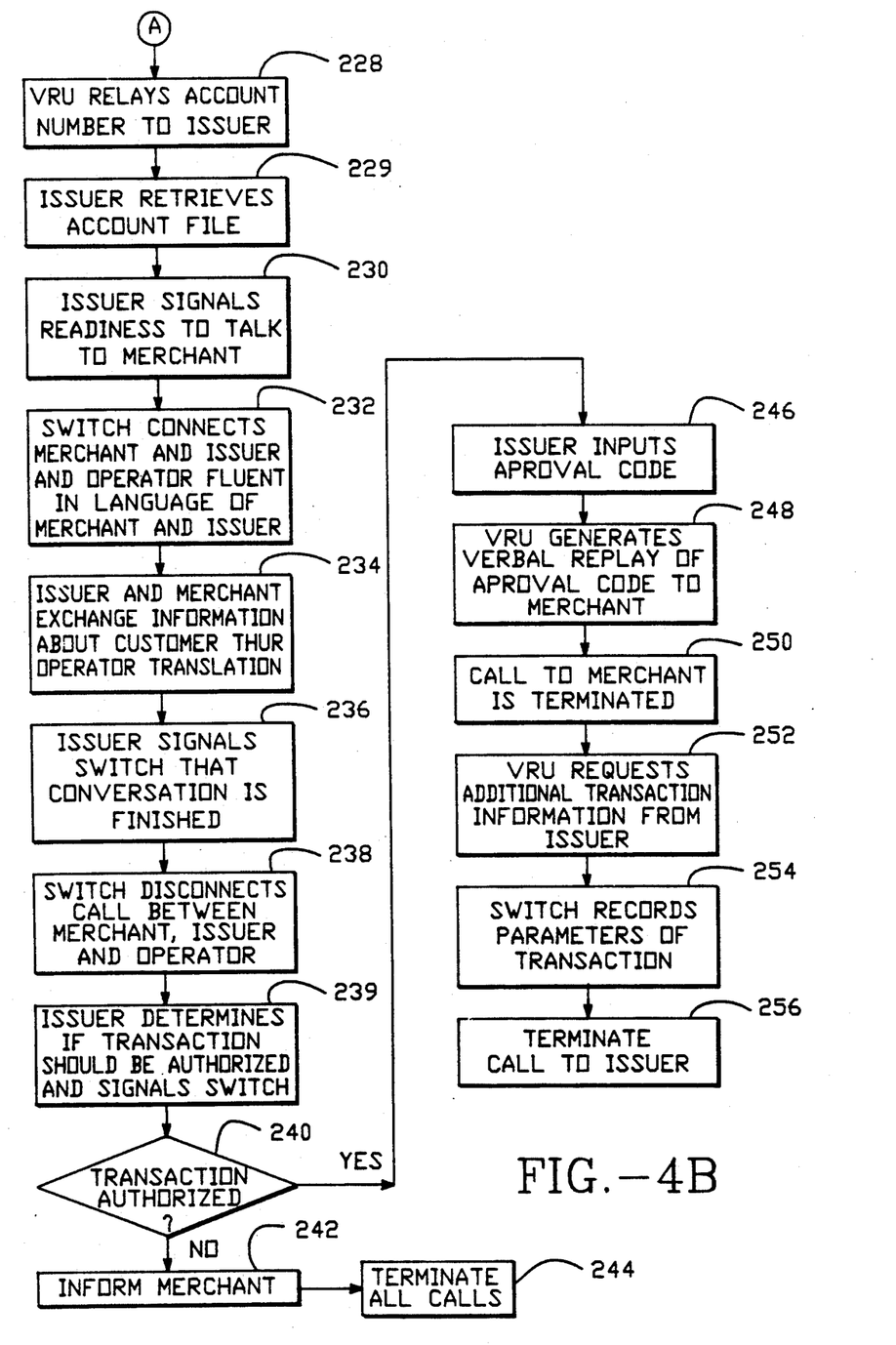

FIGS. 4A and 4B contain a flow chart illustrating the steps which are performed to carry out the method of the subject invention with respect to international transactions. To the extent that the steps are the same as in FIG. 2, the operation will only be briefly described.

As illustrated in FIG. 4, once a merchant receives a referral response he will initiate a call to the switch using a toll free number in step 200. In step 202, the call is routed through a carrier to the switch.

The first action by the switch is to perform Automatic Number Identification (ANI) (Step 204). The reasons for performing ANI processing are discussed above. In this embodiment, ANI processing is further used to identify the country in which the merchant is located (Step 205).

In step 206, the Voice Response Unit (VRU) electronically generates a verbal request to the merchant to enter the account number of the card using the touch tone buttons on the merchant's phone. Since the country in which the merchant is located has been identified, the VRU will use the principal language of that country.

The switch will then determine if the entry of the account number has been detected in step 208. If the account number has not been entered, the switch will assume that the merchant has a rotary phone and an operator who speaks the language of the country where the merchant is located will be called in step 210. This operator will be trained to request and receive the account number from the merchant. The switch will then connect the live operator to the merchant in step 211. The merchant can then give the account number to the operator who enters the number into the system (Step 212).

Once this information has been received, the switch can identify the country in which the card issuer is located in step 213. If the operator involved in the call can speak the language of the country where the issuer is located, that operator can stay on the line to handle the rest of the call (Step 215). If the operator cannot speak the language of the country where the issuer is located, the call to the operator is disconnected in step 216.

Prior to step 218, the switch will have received the account number from the merchant. Accordingly, the switch can determine the identity of the issuer and its phone number in step 218. The country where the issuer is located is also determined in step 218 if that information has not already been determined in step 213. In step 220, the switch will attempt to call the issuer.

The switch will then determine if the issuer is available and if the operator is ready to receive the account number (Step 222). The switch will monitor the call to see if a busy signal is encountered or whether there was a ring and no answer or if the call was answered but lands on an Automatic Call Distribution System (ACD) (i.e., music on hold, etc.) If any of the latter situations are detected, the call will be routed to the default processor in a manner described above (Step 223). For international transactions, the default processor will have operators that can speak the principal language of the country in which the merchant was located.

Assuming an operator at the issuer is reached, the VRU will inform the operator of the nature of the call (i.e., a referral request is pending) and will ask that the operator signal that he is ready to receive the account number (Step 224). In this embodiment, the VRU will generate the message in the principal language of the country where the issuer is located. It should be noted that if a bilingual operator is already on the line (from steps 210 to 215) the operator can perform the functions of the VRU.

The operator at the issuer will then generate a readiness signal using the touch tone buttons of the telephone, for example, by hitting the # button twice (Step 226). Once this signal is received, the VRU relays the account number to the issuer (Step 228). The issuer can then retrieve the associated account information stored in the issuer's computer (Step 229). As noted above, this account information will include data on the customer which can be used to verify the identity of the customer. The information can include a driver's license number, a social security number, a birth date or the maiden name of the customer's mother.

Once the account information is retrieved, the issuer will signal the switch that the merchant can be connected (step 230). The switch will then connect or bridge the incoming call from the merchant with the operator at the issuer (Step 232). In accordance with this embodiment, the switch will also connect a bilingual operator fluent in the principal languages of the countries where both the issuer and merchant are located. As noted above, such an operator may have already been selected. If not, the selection will take place at this time.

Once the connections are made, the issuer and merchant can exchange information aided by the translation capabilities of the operator (Step 234). It is envisioned that a full complement of bilingual operators will not be available twenty-four hours a day, seven days a week. In a situation where a bilingual operator is not available, the VRU can be programmed to ask questions and provide information in the appropriate languages. It is believed that most straightforward referral responses could be accommodated in this manner.

Once the issuer has received sufficient information from the merchant, he (or the bilingual operator) can signal the switch in step 236. The switch can then unbridge the calls in step 238 and the rest of the steps can be performed by the switch and the VRU. In some cases, it may be desirable to keep the bilingual operator available to facilitate the exchange of information.

The remainder of the steps are essentially the same as in the first embodiment. In step 239, the issuer will determine if the transaction should be approved and will signal the switch. The switch then analyzes the response from the issuer in step 240. If the transaction was not approved, the VRU simply informs the merchant (Step 242) and terminates the call to the merchant (Step 244).

If the transaction is approved, the issuer will enter an approval code (Step 246). The VRU at the switch will generate a verbal replay of the approval code for the merchant in the language of the country where the merchant is located (Step 248). The switch will then terminate the call with the merchant (Step 250). The merchant will typically enter the approval code onto the sales draft.

As noted above, the VRU can then request further information from the operator at the issuer regarding various parameters of the transaction (Step 252). For example, information may be sought as to whether the transaction was a credit card purchase or a cash advance. This information, along with the approval code and the ANI data are all recorded by the switch in step 254. This information can be supplied to the network operator and distributed to the issuers at a later time. Once the additional information is recorded, the switch will terminate the call with the issuer in step 256.

In summary there has been disclosed a improved system for handling authorization requests. The system includes an intelligent switch for receiving incoming calls from a merchant. The switch then initiates a call to the issuer of the transaction card based on the account number of the card received from the merchant. The switch then connects the merchant and issuer to enable the issuer to obtain additional information, direct from the merchant, for evaluating the transaction. The system is faster and more reliable then the procedures available in the prior art. If the merchant and issuer are located in different countries, the switch can add a bilingual operator to the call for translating the verbal communications between the merchant and the issuer.

While the subject invention has been described with reference to a preferred embodiment, other changes and modifications could be made therein, by one skilled in the art, without varying from the scope and spirit of the subjection invention as defined by the appended claims.

We claim:

1. A system for handling a telephone request for authorizing an international financial transaction, said request being from a merchant desiring to accept a transaction card for a purchase, said request being directed to the issuer of the transaction card, wherein said issuer is located in country different from the merchant, and wherein said transaction card has a unique account number associated therewith which identifies the cardholder and the issuer, said system comprising:

switch means for receiving a telephone call from a merchant requesting authorization information about a financial transaction, said switch means functioning to identify the country in which the merchant is located, said switch means including:

memory means for storing a table which includes information correlating data included in the account number of the card with the issuer of the card, said table further identifying the country in which the issuer is located, said memory means further including a list of bilingual operators and the languages in which those operators are fluent;

means for determining the issuer of the card based on the account number of the card and the information stored in the table and for identifying the country in which the issuer is located;

means for initiating a telephone call to the issuer of the card; and means for connecting the call from the merchant and the call to the issuer with an operator fluent in both the principal language of the country where the merchant is located and the principal language of the country where the issuer is located such that the operator can translate the verbal communications between the merchant and the issuer so that the issuer can evaluate the transaction.

2. A system as recited in claim 1 wherein said means for connecting the merchant and issuer operates in response to an acceptance signal generated by the issuer.

3. A system as recited in claim 1 wherein said switch means includes a means for generating a request to the merchant for entry of the account number of the card.

4. A system as recited in claim 3 wherein said request for entry of the account number is an electronically voice generated message and in the language of the country where the merchant is located.

5. A system as recited in claim 3 wherein said switch means further functions to supply the issuer with the account number of the card received from the merchant.

6. A system as recited in claim 1 wherein said switch means further includes a means for disconnecting the merchant and the issuer after the issuer has received the information from the merchant necessary to evaluate the transaction.

7. A system as recited in claim 6 wherein means for disconnecting the merchant and the issuer operates in response to a signal generated by the issuer.

8. A system as recited in claim 1 wherein said switch means further functions to receive authorization information from the issuer and route that information to the merchant.

9. A system as recited in claim 8 wherein said switch means further functions to store said authorization information received from said issuer.

10. A method for handling a telephone request for authorizing an international financial transaction, said request being from a merchant desiring to accept a transaction card for a purchase, said request being directed to the issuer of the transaction card, wherein said issuer is located in a country different from the merchant, and wherein said transaction card has a unique account number associated therewith which identifies the cardholder and the issuer, said method comprising the steps of:

receiving a telephone call from a merchant requesting authorization information about a financial transaction;

identifying the country in which the merchant is located;

determining the issuer of the card based on the account number of the card;

identifying the country in which the issuer is located;

initiating a telephone call to the issuer of the card; and connecting the call from the merchant and the call to the issuer with an operator fluent in both the principal language of the country where the merchant is located and the principal language of the country where the issuer is located such that the operator can translate the verbal communications between the merchant and the issuer so that the issuer can evaluate the transaction.

11. A method as recited in claim 10 wherein said step of connecting the merchant and issuer occurs in response to an acceptance signal generated by the issuer.

12. A method as recited in claim 10 further including the step of generating a request to the merchant for entry of the account number of the card.

13. A method as recited in claim 12 wherein said request for entry of the account number is an electronically voice generated message and in the language of the country where the merchant is located.

14. A method as recited in claim 12 further including the step of supplying the issuer with the account number of the card received from the merchant.

15. A method as recited in claim 10 further including the step of disconnecting the merchant and the issuer after the issuer has received the information from the merchant necessary to evaluate the transaction.

16. A method as recited in claim 15 wherein the merchant and the issuer are disconnected in response to a signal generated by the issuer.

17. A method as recited in claim 10 further including the step of receiving authorization information from the issuer and routing that information to the merchant.

18. A method as recited in claim 17 further including the step of storing said authorization information received from said issuer.

19. A method as recited in claim 10 further including the step of initiating a call to a default processor if the issuer is unavailable.

* * * * *